United States Patent [19]

Felten et al.

[11] Patent Number: 4,696,209
[45] Date of Patent: Sep. 29, 1987

[54] LATHE HAVING AN INTEGRATED CHUCK

[75] Inventors: Klaus Felten, Waldbronn; Walter Honroth, Osterrainen; Siegfried Kuhn, Dürnau; Hermann Schulten, Birenbach; Bruno Zeller, Lauterstein, all of Fed. Rep. of Germany

[73] Assignee: Oerlikon-Boehringer GmbH, Goppingen, Fed. Rep. of Germany

[21] Appl. No.: 712,356

[22] Filed: Mar. 15, 1985

Related U.S. Application Data

[63] Continuation-in-part of Ser. No. 531,344, Sep. 12, 1983, abandoned.

[30] Foreign Application Priority Data

Sep. 13, 1982 [DE] Fed. Rep. of Germany ....... 3233914

[51] Int. Cl.$^4$ .............................................. B23B 31/14
[52] U.S. Cl. ...................... 82/40 R; 82/30; 279/1 C
[58] Field of Search ...................... 82/30, 28 R, 40 R; 279/1 C

[56] References Cited

U.S. PATENT DOCUMENTS

| | | | |
|---|---|---|---|
| 377,779 | 2/1888 | Russom | 82/30 |
| 1,250,556 | 12/1917 | Bullard et al. | 82/30 |
| 2,493,574 | 1/1950 | Durkee | 279/1 C |
| 2,697,610 | 12/1954 | Ovshinsky | 82/40 R |
| 2,698,185 | 12/1954 | Sloan | 82/40 R |
| 3,108,412 | 10/1963 | Benjamin et al. | 82/40 R |
| 4,437,675 | 3/1984 | Koenig, III | 279/1 C |

FOREIGN PATENT DOCUMENTS 2248901 6/1975 France .............................. 279/1 C

*Primary Examiner*—Nicholas P. Godici
*Assistant Examiner*—Jerry Kearns

[57] ABSTRACT

A lathe having a spindle which has a flange for the mounting of a chuck in whose base sliding weights are displaceably mounted in radial grooves and act on the bases of the chuck jaws through rocking reversing pins for the compensation of centrifugal force. To achieve a minimum overhang of the chuck, the lathe is constructed such that the chuck base and the spindle flange are made in one piece, and that the chuck body is fastened releasably on the spindle flange.

5 Claims, 2 Drawing Figures

LATHE HAVING AN INTEGRATED CHUCK

This application is a continuation-in-part application of application Ser. No. 531,344 filed Sept. 12, 1983 and now abandoned.

BACKGROUND OF THE INVENTION

The invention relates to a lathe having a spindle which has a flange for the fastening of a chuck, in whose chuck bottom sliders are mounted for displacement in radial grooves and act on the base jaws of the chuck jaws through rocking reversing levers for the compensation of centrifugal force.

It is known that the trend toward higher speeds in lathes has made it necessary to create a means for centrifugal force compensation to prevent the chuck jaws from being thrown outwardly, loosening their grip on the workpiece. For this purpose, chucks are known which can be releasably fastened to the flange of the spindle of a lathe and which have in their base radial grooves in which sliding weights are displaceably mounted. These sliding weights act through reversing pins on the bases of the chuck jaws to compensate for centrifugal forces by forcing the jaw bases inwardly by their own, outwardly directed movement.

In lathes, the fundamental problem exists of the overhang of the chuck beyond the bearings situated behind the spindle flange. The greater the overhang is, the more the spindle tends to flutter, impairing the turning accuracy. Since the centrifugal-force compensated chucks mentioned above have a relatively great length on account of the sliding weights and the reversing pins, the problem of chuck overhang is aggravated in these chucks.

It is the object of the invention to construct the lathe of the kind described in the beginning such as to minimize the overhang of the chuck.

BRIEF DESCRIPTION OF THE INVENTION

This object is achieved in accordance with the invention by the fact that the chuck bottom and the spindle flange are made in one piece and that the chuck body is fastened releasably on the spindle flange.

By means of the one-piece construction of the spindle flange and chuck base, the chuck or at least a portion of the chuck is integrated into the spindle, so that the overhang of the chuck can be reduced by the axial length of the chuck base.

Since the chuck body can be fastened to the chuck base integrated with the spindle flange by joining means such as bolts, a compact unit is formed, so that there is no seam between the spindle flange, the chuck base and the chuck body, and the result is high rigidity in this area.

BRIEF DESCRIPTION OF THE DRAWING

The invention is explained below by way of example, with the aid of FIGS. 1 and 2.

DETAILED DESCRIPTION OF A PREFERRED EMBODIMENT

Figure 1:
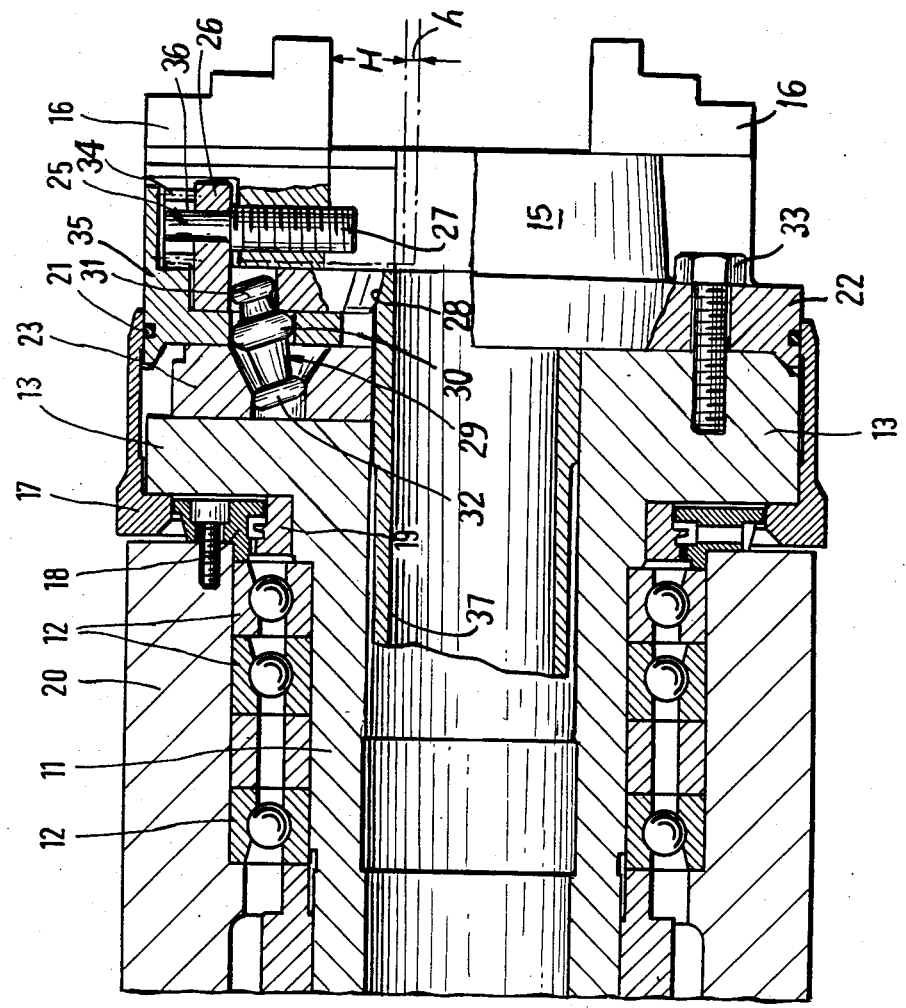
FIG. 1 is an axial cross section of the headstock spindle in the area of the spindle flange.
Figure 2:
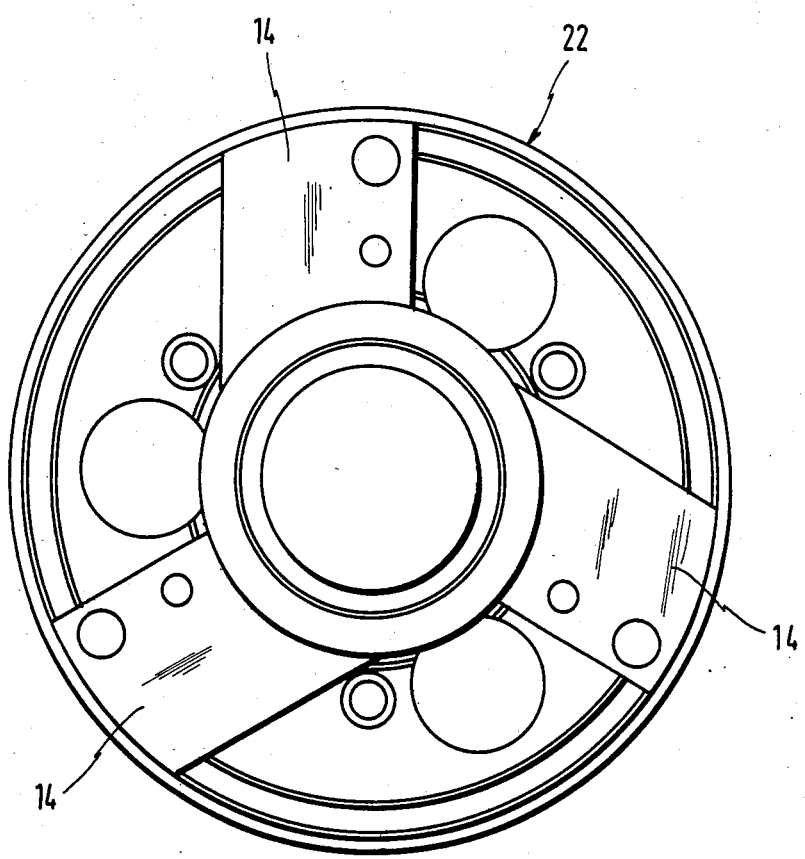
FIG. 2 is a front elevational view of the spindle flange.

The headstock spindle 11 of a lathe not shown in the drawing is mounted in bearings 12 in the machine casing 20 and has a flange 13 for the releasable fastening of a chuck provided with centrifugal force compensation, described further below. The base 22 of the chuck is made integral with the spindle flange 13 by screws 33 and can be considered as a part of the flange 13.

Between the flange 13 and the bearing 12 next to the spindle flange 13 there is a labyrinth packing 18 and 19 which is fastened to the machine casing 20.

The interstice between the casing 20 and the flange 13 is covered by a ring 17 which overreaches flange 13 and a portion of the chuck body 15 on whose circumferece an O-ring 21 is disposed under the ring 17.

Within the chuck body 15 are the parts which are necessary for the adjustment of the jaws 16 by means of a draw tube inserted into the spindle bore.

The chuck 15 has jaws 16 of which only one is visible in FIG. 1. In a manner described further below, the jaw 16 is in connection with a drive jaw 26 which by means of splines 28 may be radially adjusted by an amount h by a piston 37. Piston 37 is arranged in the hollow spindle 11.

For centrifugal force compensation, the chuck 15 is provided with a weight 23 which is displaceable in a radial groove. Weight 23 and jaw 26 is engaged by a reversing bolt 29 having an arcuate central section 30 and arcuate end sections 31, 32. By means of the central section 30 the reversing bolt 29 is pivotally journalled in flange or bottom 13 so that the reversing bolt upon a centrifugal force being applied radially outwardly on weight 23 presses the jaws 26 and 16 radially inwardly.

Between jaws 26 and 16 there is arranged a spindle 25 by means of which the range H of jaw 16 can be adjusted for adaptation to workpieces of different diameter. The adjusting spindle 25 has an upper cylindrical section 36 and a lower section 27 provided with a thread. The upper section 36 of spindle 25 extends through a bore in jaw 26 and that its upper end carries a gear 34 so that the jaw 26 is held between this gear and the lower spindle section 27. Upon a displacement of jaw 26 by means of the piston 37 in axial direction the spindle 25 is also displaced in axial direction. Since the spindle 25 with its threaded section 27 is in engagement with jaw 16 the latter will also be displaced.

If the jaw 16 is expected to carry out a displacement corresponding to the maximum range H for adjustment to a workpiece with different diameters, as indicated by the dot dash position of the jaw 16, spindle 25 is rotated. Since the upper spindle section 36 does not have a thread it can freely rotate in the bore of jaw 26. The rotation of the spindle is effected by means of a gear 34 which is in engagement with a drive ring 35 at the outer circumference of chuck 15. The drive ring is common to all jaws 16 so that they can be displaced by same amount simultaneously. The turning of the ring 35 can be effected by means of a key when the chuck is stationary or with a stationary drive ring 35 and a turned chuck by the main spindle drive of the lathe.

What is claimed is:

1. A lathe comprising:
   a headstock spindle having a flange on one end thereof;
   a chuck body having a chuck base integral with said spindle flange;
   chuck jaws mounted on said chuck body;
   means for compensating for centrifugal force acting on said chuck jaws, said means including radial grooves defined in said headstock spindle flange, counterweights movably located in said radial grooves and reversing levers connecting said counterweights to said chuck jaws for transmitting movement of said counterweights to said chuck jaws.

2. The lathe defined in claim 1 wherein said reversing levers extend into said spindle flange located grooves.

3. A lathe according to claim 1, further comprising a cover ring on the circumference of said spindle flange overreaching said chuck body, and an O-ring located between the circumference of said cover ring and said chuck body.

4. A lathe according to claim 1, comprising joining elements fastening said chuck body to said spindle flange.

5. A lathe according to claim 4, comprising a cover ring on circumference of said spindle flange overreaching said chuck body, and an O-ring located between the circumference of said chuck cover and said chuck body.

* * * * *